UNITED STATES PATENT OFFICE.

ERNEST L. RANSOME, OF OAKLAND, CALIFORNIA.

BRICKS, BUILDING-BLOCKS, &c., MADE OF PURIFIED ASHES AND LIME.

SPECIFICATION forming part of Letters Patent No. 322,559, dated July 21, 1885.

Application filed September 19, 1884. (No specimens.)

*To all whom it may concern:*

Be it known that I, ERNEST L. RANSOME, a subject of Queen Victoria, residing in Oakland, county of Alameda, State of California, have invented certain Improvements in Utilizing Cinders, Ashes, and other like products of combustion in the Manufacture of Brick, Tile, and other articles of the kind; and I do hereby declare that the following is a full, clear, and exact description of my said invention and the manner of carrying out, practicing, and using the same.

My invention relates to improvements made in the manufacture of bricks, building-blocks, and like molded articles out of certain waste products of combustion. It has for its object to convert the waste product obtained from the combustion of fuel, and commonly known as "ashes," into a material from which bricks of excellent quality can be manufactured at exceedingly low cost. This waste matter, constantly accumulating in all localities where fuel is burned, may be secured in unlimited quantities at little or no cost, and is oftentimes available in places where clay of good quality cannot be had. As gathered from many sources of supply such product will nearly always include some partially or imperfectly consumed particles of fuel, of which the proportion will sometimes be so considerable in the product that it will constitute what is generally termed "cinders," and under the names of "ashes" and "cinders" neither form of such waste product will be found in a condition absolutely free from the other. Therefore, while designating this matter or product by the name of "ashes," I wish to be understood as including under that term all waste products derived from the combustion of fuel in shops, factories, dwellings, and other places where fuel is burned.

My invention consists accordingly in preparing and treating ashes from fuel substantially as hereinafter described, and in producing and manufacturing bricks, building-blocks, and other molded forms and articles therefrom.

To carry out my invention, I proceed as follows: The waste matter as it is obtained from various sources is first passed through screens to separate the ashes from the particles of cinders and other solid substances and lumps, and to bring the ashes to a condition of uniform fineness. This step includes also the reduction of the separated cinders to a state of ash for the purpose of utilizing the whole of the waste matter; and as in many instances much of the matter available will be found to contain a considerable amount of cinders, especially where the matter is collected from dwellings, the cinders while being converted into such form may be used to advantage as fuel for running the machinery of the mill and carrying on other operations in the manufacture where heat is required. The material in this state of ashes should be free from such partially-consumed particles when it is desired to secure special fire-proof and durable qualities in the finished brick; but where such special characters are not essential a proportion of the particles may be allowed to remain in the material, or may be incorporated by mixing with the ashes, particularly where a lighter character of brick for filling spaces, deadening walls, and like purposes is to be made. For this purpose it is well to remove the cinders by screening, and then reduce them to a condition of fineness by pulverizing or granulating them, after which a small proportion of the reduced particles may be incorporated in the ashes. At this point it should be observed that the strength as well as the fire-proof and weather-proof qualities in the finished brick will vary in proportion as the cinders are increased or diminished in the material, and that such qualities and properties will be greatest in the brick when the cinders are not present. The material thus prepared is then washed to remove the soluble salts which will be found to exist in nearly all waste matter of this character to be had, and particularly in that obtained from dwellings and other sources where wood and matter other than coal is consumed with the fuel. This extraction of the soluble salts is an important and necessary step in the preparation of the material, for if not removed this soluble matter will effloresce on the surface of the finished bricks and render them unsightly and useless for decorative purposes. Nearly all the waste matter collected for this purpose will require to be thus treated. To the material thus prepared a proportion of lime is then added for a cementing or binding agent, and after being properly moistened for the molding operation the material is formed into bricks, blocks, and other forms by means of a powerful press. In most of the matter available lime will be present as a constituent, and in ordinary cases the proportion of lime to be mixed with the ashes will be from one to ten per cent., the quantity being increased in rare cases where there is little or no lime present. It may be mixed directly with the ashes either in a dry state or as powder or in solution, according as the prepared material is dry or wet. If mixed in a dry state, sufficient water is subsequently added to bring the mixture to the proper consistency for molding, but where the material is wet or moist the lime may be added in solution, and after being thoroughly incorporated the mixture is brought to proper consistency for molding by driving off excess of moisture by heat.

In the use of the lime or binding agent it should be observed that the greater the proportion of lime used the stronger will be the brick, and the smaller the proportion of lime the better the fire-proof qualities.

In the molding operation the press used should have a capacity of from twenty-five to two hundred tons per brick, according to the grade or quality of brick to be produced, as both the strength and finish of the article will increase with the amount of pressure employed.

As an effective way of applying the binding agent, I intimately mix a proportion of lime with the cinders, and then by the operation of reducing the cinders by burning I combine the the lime therewith and produce in such way a stronger binding agent than the lime alone, inasmuch as the lime by such treatment is converted from an ordinary rich lime into an eminently hydraulic lime, possessing stronger binding qualities. The proportions that may be used to advantage for this purpose are one hundred pounds of lime to one ton of cinders, using as much lime as the cinders will properly burn. Whatever lumps may remain in this product after the burning operation must be removed or reduced by grinding or granulating. In this burning operation it will be obvious that any suitable substance containing lime can be used, such as shells, gas-lime, and other lime refuse, and also that for a binding agent any cement containing lime, such as the natural cements of America or the well-known Portland cement may be employed, where these advantages gained might be considered an offset to the additional expense, but for ordinary purposes the hydraulic or rich limes are suitable. The bricks manufactured in this manner from such hitherto waste matter can be furnished at extremely low cost, in appearance being equal to the best quality of pressed brick, and in lightness superior thereto.

I am aware that the metallic refuse and vitrified matter known as slag has been prepared and used with cement or lime for the manufacture of artificial stone, bricks, and molded forms, but all the known processes and modes of treating such refuse are useless and of no avail for the purpose of converting the waste product known as ashes into a material for the manufacture of a strong and durable brick, for the reason that the purification of the ashes to get rid of the soluble salts and combustible particles is not provided for.

Having thus described my invention, what I claim, and desire to secure by Letters Patent, is—

The herein-described improvement in the manufacture of bricks, building-blocks, and like molded articles, which consists in mixing purified ashes with lime and molding under heavy pressure, substantially as set forth.

ERNEST L. RANSOME.

Witnesses:
EDWARD E. OSBORN,
JNO. L. TAGGARD.